(12) United States Patent
Dickinson et al.

(10) Patent No.: US 11,773,887 B2
(45) Date of Patent: Oct. 3, 2023

(54) FASTENER CLIP ASSEMBLY WITH EXPANDABLE CAP

(71) Applicant: Termax LLC, Lake Zurich, IL (US)

(72) Inventors: Daniel James Dickinson, Lincolnshire, IL (US); David Friesorger, Lakemoor, IL (US)

(73) Assignee: TERMAX COMPANY, Lake Zurich, IL (US)

( * ) Notice: Subject to any disclaimer, the term of this patent is extended or adjusted under 35 U.S.C. 154(b) by 54 days.

(21) Appl. No.: 17/518,503

(22) Filed: Nov. 3, 2021

(65) Prior Publication Data

US 2022/0099119 A1  Mar. 31, 2022

Related U.S. Application Data

(63) Continuation-in-part of application No. 16/571,185, filed on Sep. 15, 2019, now Pat. No. 10,995,783.

(60) Provisional application No. 63/113,447, filed on Nov. 13, 2020.

(51) Int. Cl.
*F16B 5/06* (2006.01)
*F16B 21/07* (2006.01)
*B60R 13/02* (2006.01)

(52) U.S. Cl.
CPC .......... *F16B 5/065* (2013.01); *B60R 13/0206* (2013.01); *F16B 21/078* (2013.01)

(58) Field of Classification Search
CPC .... F16B 5/0657; F16B 21/078; F16B 21/075; F16B 19/1081; F16B 21/16; B62D 27/06; B60R 13/0243; B60R 13/0206
See application file for complete search history.

(56) References Cited

U.S. PATENT DOCUMENTS

| | | | | |
|---|---|---|---|---|
| 4,874,276 A * | 10/1989 | Iguchi | ................. | F16B 19/1081 D8/382 |
| 5,641,255 A * | 6/1997 | Tanaka | ................ | F16B 19/1081 411/48 |
| 6,264,393 B1 * | 7/2001 | Kraus | ................. | B60R 13/0206 24/297 |
| 7,374,200 B2 * | 5/2008 | Ikeda | .................... | F16B 21/075 280/730.2 |
| 8,650,722 B2 * | 2/2014 | Hosoya | ............... | B60R 13/0206 24/292 |
| 9,062,696 B2 * | 6/2015 | Demerath | ............. | B60R 21/217 |
| 9,453,523 B2 * | 9/2016 | Maschat | ............... | F16B 21/086 |
| 10,590,968 B2 * | 3/2020 | Benedetti | ............ | B60R 13/0206 |

(Continued)

*Primary Examiner* — Robert Sandy
*Assistant Examiner* — Rowland Do

(57) ABSTRACT

A system and method including a fastener clip assembly including a cap, the cap including a cap top portion, one or more cap legs extending from the top portion, one or more feet at the bottom of the legs, and one or more tabs extending on the inside of the one or more legs. The fastener clip assembly also includes a pin, the pin being configured to slide around and within the cap, based at least upon the pin being configured to be snapped closed around the cap to form a cap-pin assembly. The cap-pin assembly is configured to couple a panel to a slot in a chassis based at least upon the cap-pin assembly being configured to attach to the slot in the chassis and to the panel. The cap is configured to expand around the chassis slot based at least upon the pin being configured to push the tabs outward in response to the pin being pushed up passed the tabs.

17 Claims, 18 Drawing Sheets

(56) References Cited

U.S. PATENT DOCUMENTS

| | | | |
|---|---|---|---|
| 11,401,963 B2* | 8/2022 | Lee .................... | F16B 21/075 |
| 2005/0271492 A1* | 12/2005 | Jackson, Jr. .......... | F16B 21/076 |
| | | | 411/112 |
| 2009/0263210 A1* | 10/2009 | Loewe ................ | F16B 19/1081 |
| | | | 411/553 |
| 2014/0050548 A1* | 2/2014 | Loewe ................. | F16B 5/0657 |
| | | | 411/48 |
| 2015/0211565 A1* | 7/2015 | Benedetti ............ | B60R 13/0206 |
| | | | 24/292 |
| 2017/0051780 A1* | 2/2017 | Dickinson ............ | F16B 21/076 |

* cited by examiner

FASTENER CLIP ASSEMBLY WITH EXPANDABLE CAP

A. BACKGROUND

The invention relates generally to devices for fastening objects, and more particularly to a fastener clip assembly for insertion into an engagement structure, such as a vehicle chassis, a hollow substrate, a wall, a plate, or any suitable surface.

A number of devices and fasteners are currently available for fastening panels, such as body panels and automobile interior trim piece panels, to the chassis of a vehicle. As used herein, a body panel refers to, for example, any interior or exterior body panel on a vehicle, a plastic interior trim piece, door panel, headliner or any interior trim piece. Additionally, the panel may be any suitable exterior body panel, such as a fender, bumper, quarter panel or door panel. The chassis of the vehicle may include any substrate, plate, body panel, structural framework, chassis component or subcomponent, wall or any suitable object.

These conventional fastener devices provide approximately relatively equal levels of insertion and extraction force. These body panels often attach to the chassis of an automobile with a relatively high level of insertion force while providing a relatively low level of extraction force.

Fastener clips, such as two-piece fasteners (multi-piece), are known for attaching body panels to an automobile chassis. Two-piece fasteners are used so that if the panels are removed after original installation, such as to service the components in the door, they may be pulled apart so that one portion remains attached to the sheet metal while the other remains attached to the trim panel. The two pieces may also be reattached after separation. However, two-piece fasteners require manufacturing of multiple pieces and labor-intensive assembly of the two pieces and thus are relatively expensive.

One-piece fasteners are typically less expensive than two or multi piece fasteners. One-piece fasteners have a base to attach to a body panel and a post attached to the base and wings attached at least to the top of the post at a tip of the fastener for fastening to a frame slot. However, if the frame slot and the fastener are misaligned then the forces on the wings are unequal since the wing closest to the slot edge will experience higher wing compression while the other wing will have insufficient springing force to engage the slot. As the clip is forced into the slot, such high forces on one wing may cause the wing to break off thus rendering the fastener incapable of fastening the body panel to the frame. Worse, the broken, damaged or weakened wing can cause detachment of the body panel or contribute to rattles.

The wings of conventional fasteners have a sharp, unsmooth groove to engage the edge of the frame slot. When the clip is removed however, the sharp edges of the frame slot cut into the softer plastic and cut the groove. During manufacture, the slots are typically formed in the frame of the vehicle, such as in an inner roof or door sheet metal structure, by punching the sheet metal. As the punch enters the sheet metal, the outer part of the sheet metal is pushed toward the inside and a metal puncture or ridge is formed on the inside of the sheet metal. The resulting slot edge on the outer part of the slot is relatively smooth; however, the inner part of the slot edge is sharp and rough. Upon removal of the fastener clip, the sharp edges of the frame cut off the groove so that the clip may not be reinserted and reusable.

If the slot is off-center or if the sheet metal varies in thickness or if tolerances in production of the slot in the vehicle chassis or in the trim-piece exist, for example, then engagement of one portion of the hole in the chassis with one of the wings may not provide suitable frictional engagement. Twisting of the body panel will be likely more prevalent because less than all contact points are actually made with the slot of the vehicle chassis. As a result, conventional single piece fasteners do not self-align themselves when the fastener and the body panel are misaligned and are prone to wing breakage such that the fastener cannot be re-attached.

Conventional fasteners typically do not adequately secure the panel to the vehicle chassis having variations in slot size and location or sheet metal with different curvature or thicknesses throughout. Conventional single piece fasteners do not self-align themselves when the fastener and the body panel are misaligned and are prone to wing breakage such that the fastener cannot be re-attached. Also, conventional fasteners are not suitable when subjected to a variety of environmental conditions, such as in the presence of vibration at various levels of amplitude and frequency. For example, conventional fasteners of this type typically do not prevent or minimize the amount of buzzing, rattling or any other type of noise that may cause attention to the occupants of the vehicle or otherwise weaken the attachment. Conventional fasteners do not adequately accommodate various levels of production tolerances, such as various dimensions amongst, for example, the body panels as well as the vehicle chassis. Thus, conventional fastener devices typically do not self-align nor adequately fasten to a range of sheet metal thicknesses and do not minimize or eliminate buzzing and rattling and do not sufficiently accommodate variations in production tolerances. As a result, wear, squeaks, rattles, buzzing, corrosion and loss of elasticity and loss of sealing may result, especially after years of vehicle operation and exposure to vibration, heat, humidity, and other environmental conditions.

B. BRIEF DESCRIPTION OF THE DRAWINGS

Other objects and advantages of the invention may become apparent upon reading the detailed description and upon reference to the accompanying drawings.

Figure 1:
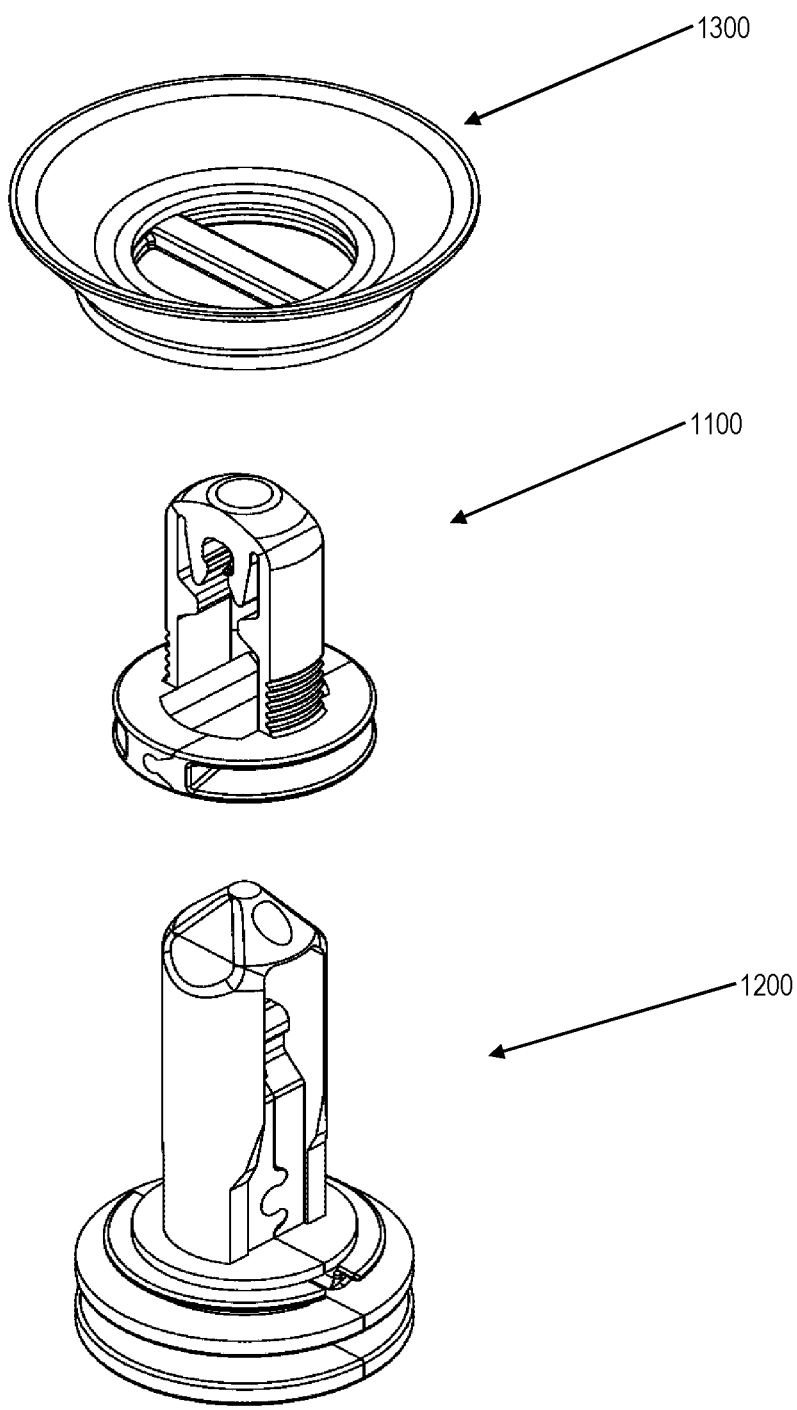
FIG. 1 is an exploded view of a fastener clip assembly, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

C. DETAILED DESCRIPTION

Disclosed below are various concepts related to, and embodiments of, systems and methods for automatically detecting similarities between sensors in order to identify and match sensors of a similar nature and type.

FIG. 1 is an exploded view of a fastener clip assembly, in accordance with some embodiments.

Figure 2:
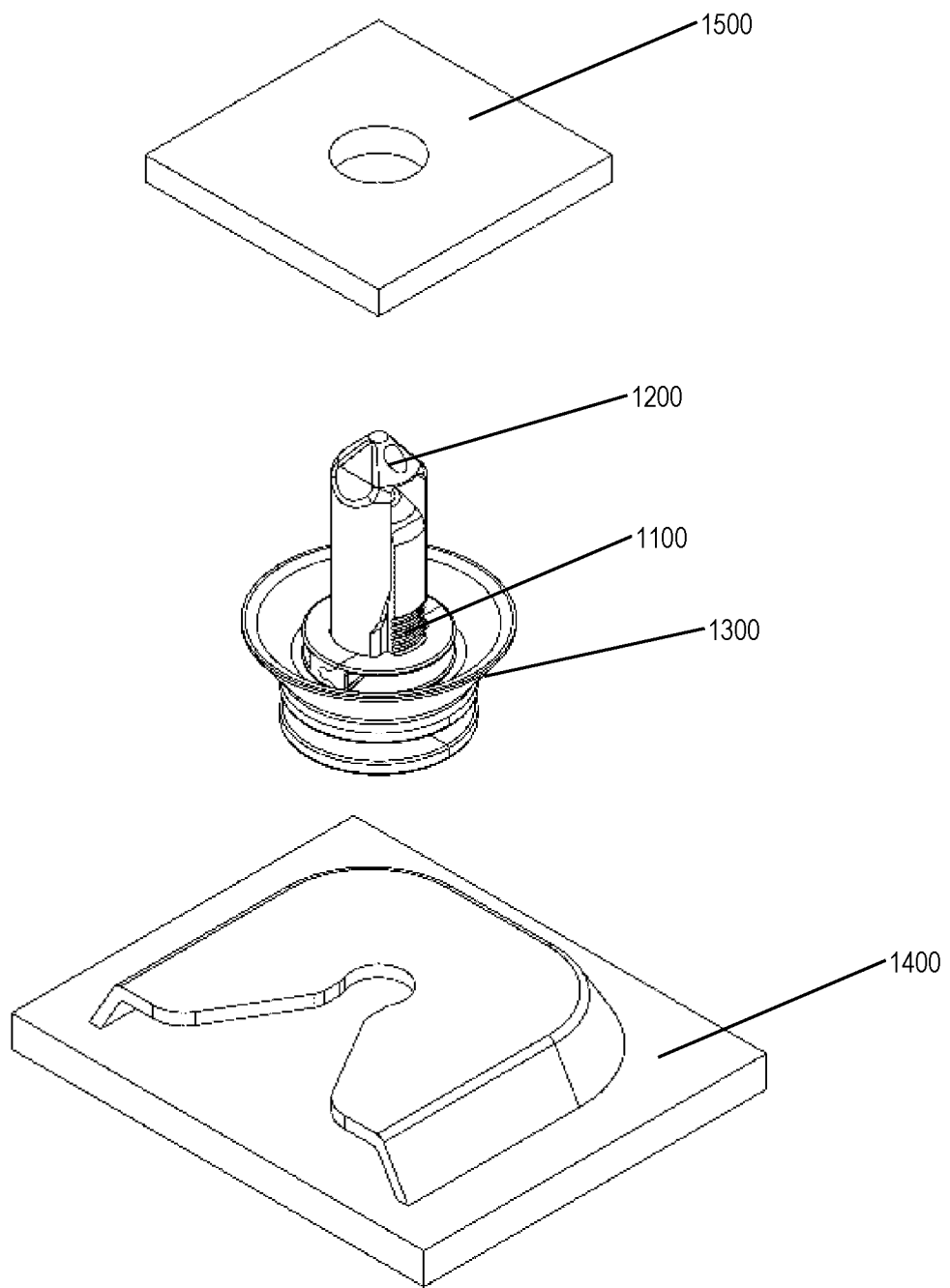
FIG. 2 is an alternative exploded view of a fastener clip assembly, in accordance with some embodiments.

FIG. 2 is an alternative exploded view of a fastener clip assembly, in accordance with some embodiments.

In some embodiments, the fastener clip assembly comprises cap/grommet 1100 and pin/pin retainer 1200. Pin 1200 is configured to engage and secure itself on cap 1100 based at least upon pin 1200 and cap 1100 being configured to slide within each other when the two are in an interlocked position with each other.

In some embodiments, the two-piece assembly may be configured to retain various trim panels (such as panel 1400) to a car chassis (such as chassis 1500). It should be noted, however, that the fastener clip assembly may be configured to join various other pairs of objects to each other.

The cap/pin assembly may be configured to attach to a slot/hole in chassis 1500 on one end and to a doghouse or similar object in panel 1400 on the other end. Pin 1200 may be coupled onto a doghouse by snapping a corresponding stem/depression on the pin 1200 sideways into a receiving opening in panel 1400. In some embodiments, the doghouse may be coupled to panel 1400 by various means (such as an adhesive, for example) or the doghouse may be molded onto panel 1400.

In some embodiments, seal component 1300 is configured to attach over pin 1200 and to form a seal against the surface of chassis 1500 when the pin/cap assembly is attached to chassis 1500. In some embodiments, forming a seal against chassis surface 1500 prevents water, dirt, and other debris from entering through the chassis slot from the outside to the inside of the chassis.

Figure 3:
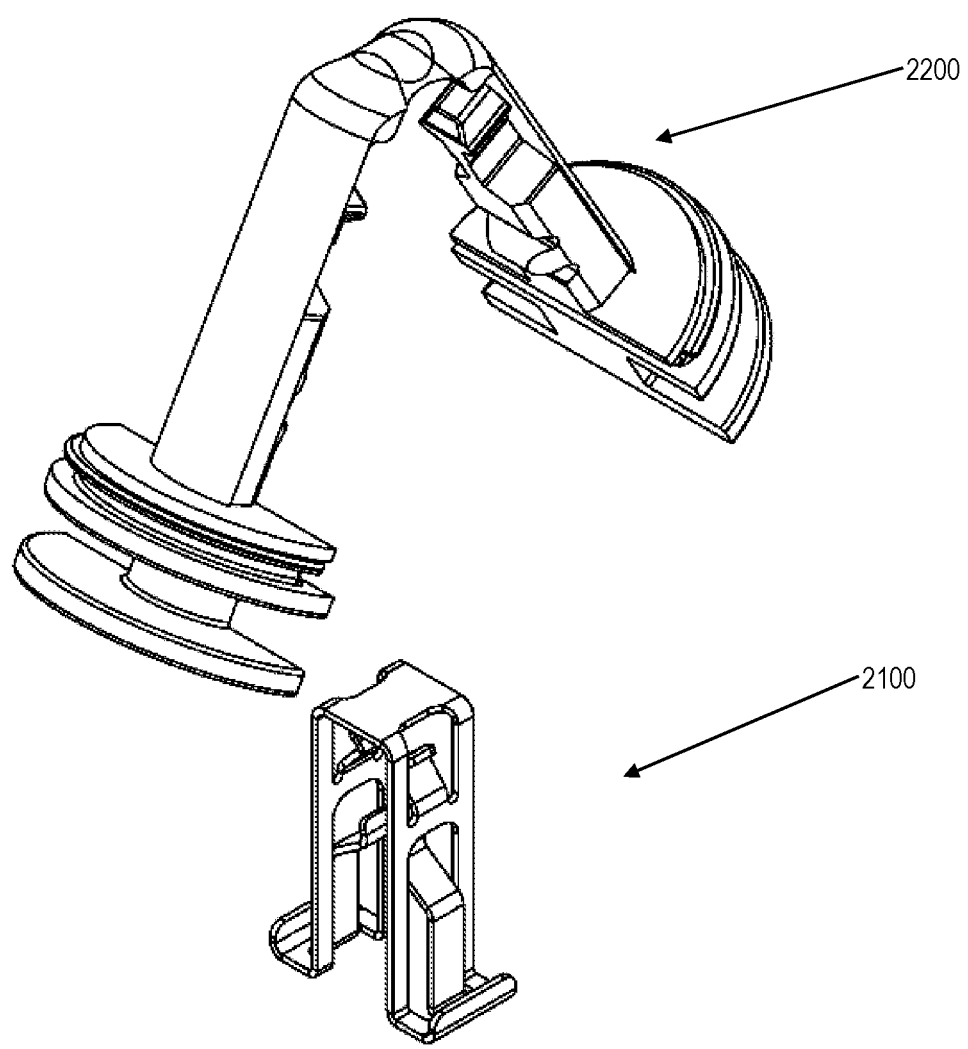
FIG. 3 is an exploded view of another fastener clip assembly, in accordance with some embodiments.

FIG. 3 is an exploded view of another fastener clip assembly, in accordance with some embodiments.

Figure 4:
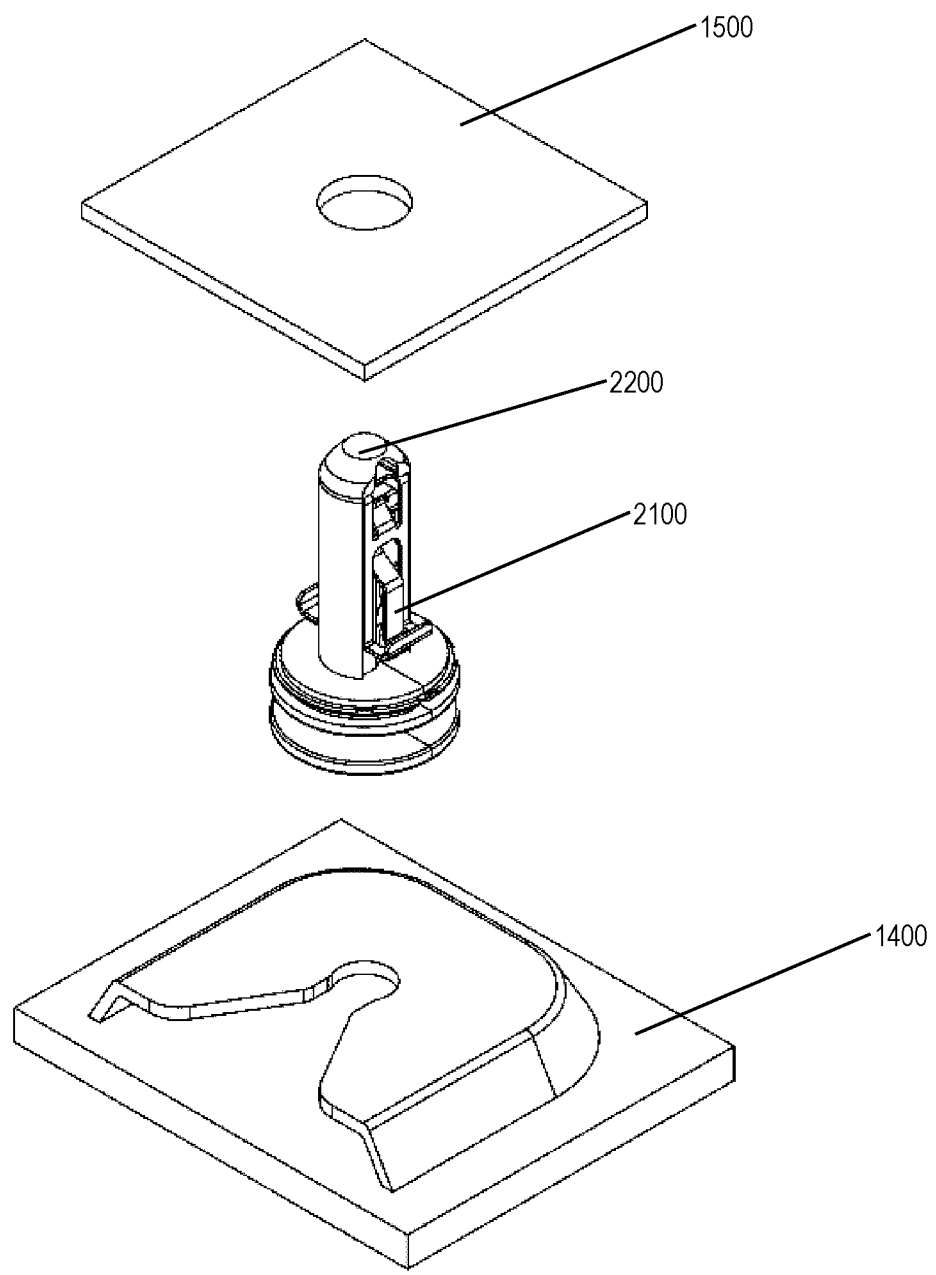
FIG. 4 is an alternative exploded view of another fastener clip assembly, in accordance with some embodiments.

FIG. 4 is an alternative exploded view of another fastener clip assembly, in accordance with some embodiments.

In some embodiments, the fastener clip assembly comprises cap 2100 and pin/pin retainer 2200. Pin 2200 is configured to engage and secure itself on cap 2100 based at least upon pin 2200 and cap 2100 being configured to slide within each other when the two are in an interlocked position with each other.

In some embodiments, the two-piece assembly may be configured to retain various trim panels (such as panel 1400) to a car chassis (such as chassis 1500). It should be noted, however, that the fastener clip assembly may be configured to join various other pairs of objects to each other.

The cap/pin assembly may be configured to attach to a slot/hole in chassis 1500 on one end and to a doghouse or similar object in panel 1400 on the other end. Pin 2200 may be coupled onto a doghouse by snapping a corresponding stem/depression on the pin 2200 sideways into a receiving opening in panel 1400. In some embodiments, the doghouse may be coupled to panel 1400 by various means (such as an adhesive, for example) or the doghouse may be molded onto panel 1400.

In some embodiments, an optional seal component (not shown in this figure) may be configured to attach over pin 2200 and to form a seal against the surface of chassis 1500 when the pin/cap assembly is attached to chassis 1500. In some embodiments, forming a seal against chassis surface 1500 prevents water, dirt, and other debris from entering through the chassis slot from the outside to the inside of the chassis.

Figure 5:
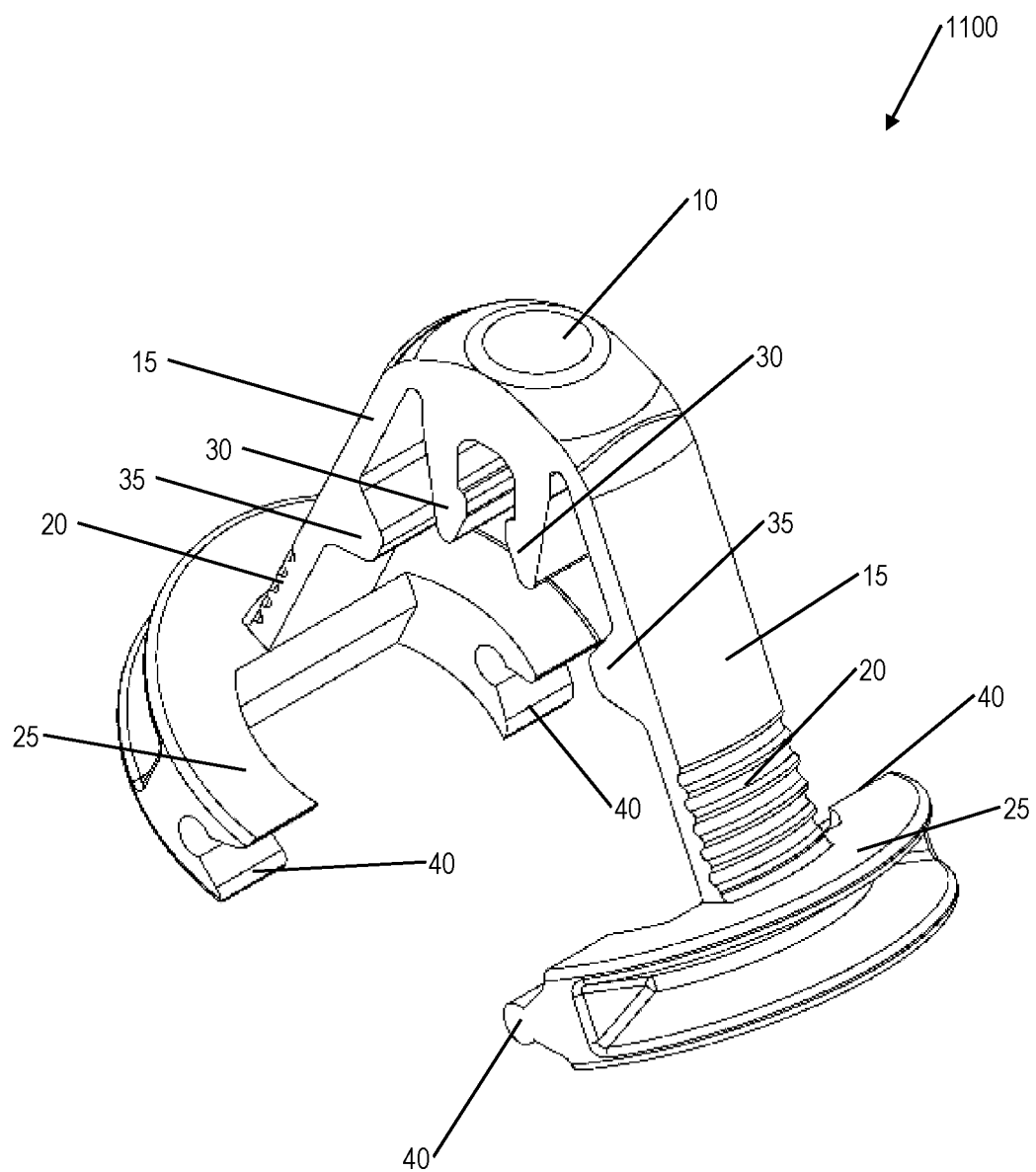
FIG. 5 is a view of a cap of a fastener clip assembly, in accordance with some embodiments.

FIG. 5 is a view of a cap of a fastener clip assembly, in accordance with some embodiments.

In some embodiments, cap 1100 is configured to be interlocked with pin 1200, and the two-part assembly is configured to engage and attach to a slot in a chassis and in addition engage and attach to a panel.

In some embodiments, cap 1100 comprises cap top portion 10 from which pair of walls/legs 15 extend, ending in cap feet 25. Cap 1100 may also include four cap snap locks 40, a pair on each of the cap feet 25. The pair of legs and the pair of feet form two halves of the cap with a void in between configured to receive a portion of pin 1200 when the two are in the interlocked position.

In some embodiments, the pair of feet 25 are configured to couple to each other based at least upon, opposing pairs of snap locks 40 being male and female and being configured to lock with each other. The two halves of the cap are thus brought together to form the cap around a portion of the pin while permitting the pin to slide up and down relative to the cap within the space formed inside the locked cap 1100.

In some embodiments, cap 1100 includes tabs 35 that are configured to expand legs 15 outwards based at least upon a portion of pin 1200 being pushed up with respect to cap 1100. In some embodiments, based at least upon the outward expansion of legs 15 ribbed portions 20 of the legs are configured to grip a slot in chassis into which the fastener clip was inserted and secure the cap to the chassis.

In some embodiments, cap 1100 includes cap female snap lock 30, which is configured to receive and lock onto a corresponding portion of pin 1200 to secure the pin to the cap.

Figure 6:
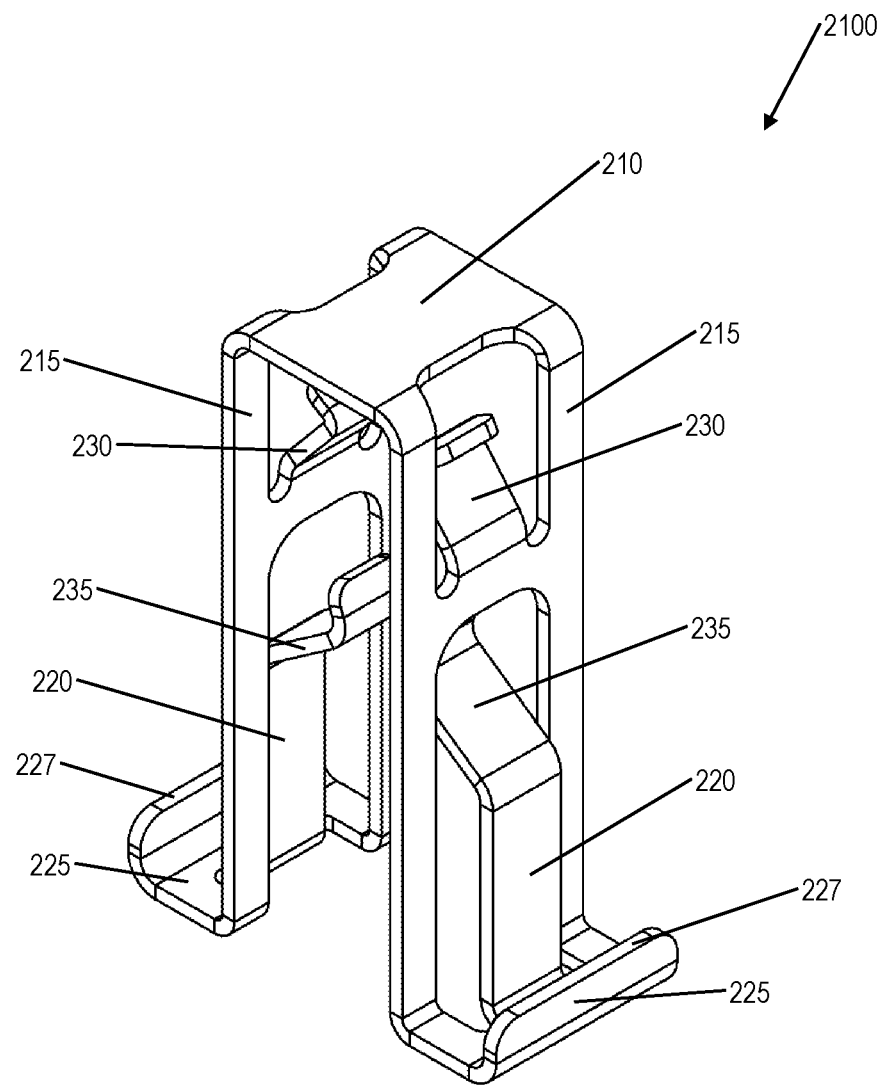
FIG. 6 is a view of another cap of a fastener clip assembly, in accordance with some embodiments.

FIG. 6 is a view of another cap of a fastener clip assembly, in accordance with some embodiments.

In some embodiments, cap 2100 is configured to be interlocked with pin 2200, and the two-part assembly is configured to engage and attach to a slot in a chassis and in addition engage and attach to a panel. In some embodiments, cap 2100 may be constructed out of metal. In other embodiments, various other materials may be used.

In some embodiments, cap 2100 comprises cap top portion 210 from which pair of legs 215 extend, ending in cap feet 225. The pair of legs and the pair of feet form a void in between them that is configured to receive a portion of pin 2200 when the pin is interlocked around the cap.

In some embodiments, the pair of feet 225 end in raised feet portions 227, which are configured to provide a stop for cap 2100 against a chassis as cap 2100 is pushed into a slot on the chassis.

In some embodiments, cap 2100 may also include pair of wings 220 extending up from feet 225. Wings 220 may be configured to protrude through gaps in legs 215, ending in tabs 235. In some embodiments, tabs 235 that are configured to expand wings 220 outwards based at least upon corresponding portions of pin 2200 being pushed up with respect to cap 2100. In some embodiments, based at least upon the outward expansion of wings 220, the wings 220 are configured to grip a slot in chassis into which the fastener clip was inserted and secure the cap to the chassis.

In some embodiments, based at least on some flexibility in wings 220, the outward motion of wings 220 is configured to engage a range of widths of a chassis.

In some embodiments, cap 2100 includes cap female snap locks 230, which are coupled to legs 215. Female snap locks 215 are configured to receive and lock onto a corresponding portion of pin 2200, thereby securing the pin to the cap.

Figure 7:
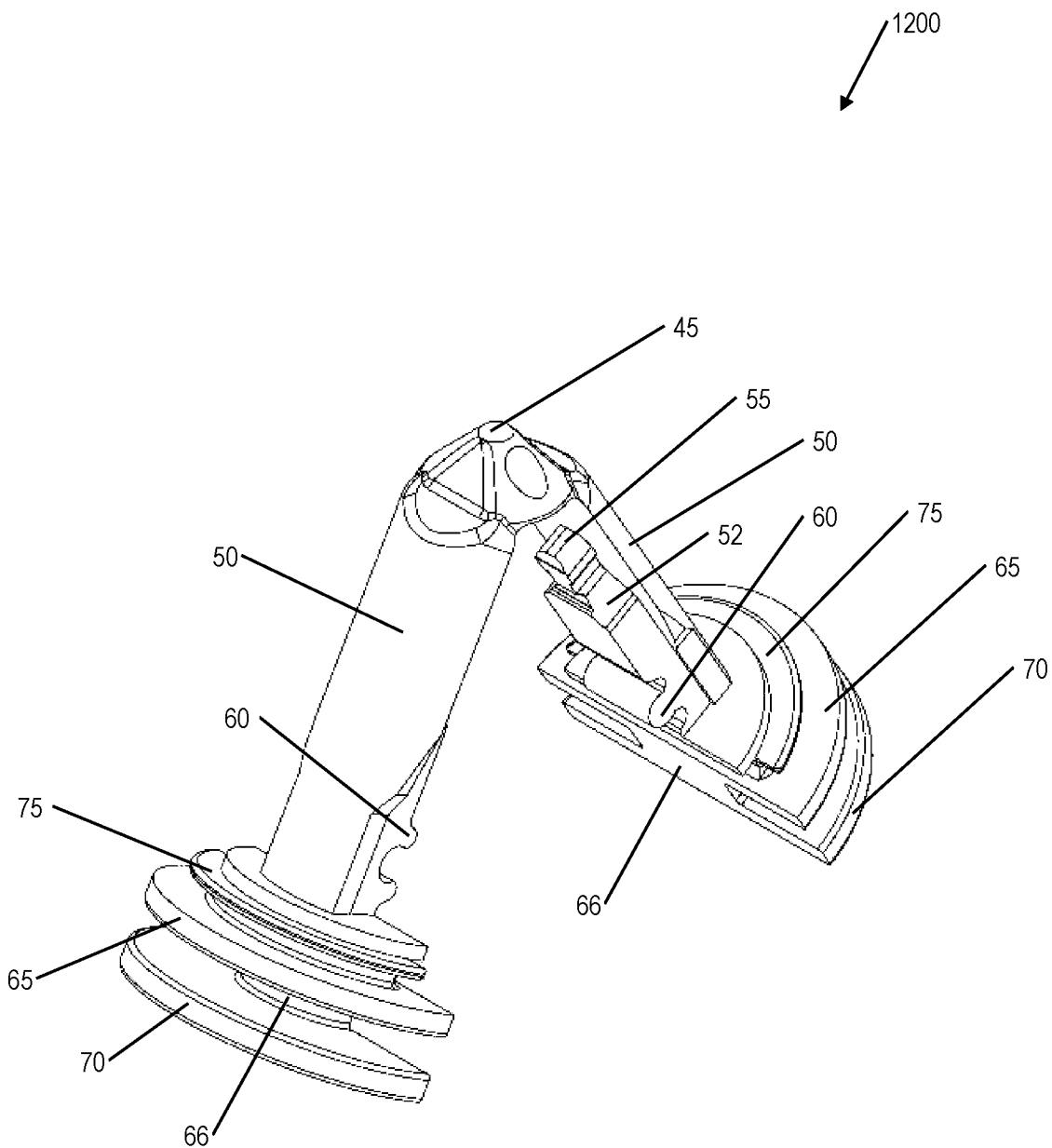
FIG. 7 is a view of a pin of a fastener clip assembly, in accordance with some embodiments.

FIG. 7 is a view of a pin of a fastener clip assembly, in accordance with some embodiments.

In some embodiments, pin 1200 is configured to be interlocked with cap 1100, and the two-part assembly is configured to engage and attach to a slot in a chassis and in addition engage and attach to a panel.

In some embodiments, pin 1200 includes a pin top portion 45 extending down into pair of legs 50. In some embodiments, pin top portion is configured to enter a slot in a chassis first and thus protect the cap and other parts of the assembly from being damages or pushed the wrong way in response the clip being inserted into the slot.

At the bottom end, the legs 50 include a first surface 65 and a second surface 70 coupled via stem 66. In some embodiments, pin 1200 is configured to be attached/snapped to/onto a doghouse on a panel via stem 66 while being supported against the doghouse by first surface 65 and second surface 70.

In some embodiments, pin 1200 may also include optional edge 75 configured to receive a seal, such as seal 1300. In some embodiments, the seal may be configured to form a seal against a chassis. In some embodiments, the seal may prevent debris and moisture from entering a vehicle. In some embodiments, seal 1300 may be overmolded using rubber or other such material onto pin 1200. In some embodiments, the rubber from seal 1300 may extend into a channel passing through pin 1200 for additional stability.

In some embodiments, pin 1200 also includes pin snap locks 60, which include a male portion and a female portion, one on each of pin legs 50. In some embodiments, pin snap locks 60 are configured to couple the two halves of pin 1200 together in response to the two halves being pushed together during assembly.

In some embodiments, the two halves of the pin define a void between configured to receive a portion of the pin as the pin and the cap are interlocked together. In some embodiments, pin male snap lock 55 is configured to engage corresponding cap female snap lock 30 in response to the pin being pushed up with respect to the cap. In an interlocked position, the pin and the cap are configured to slide up and down with respect to each other.

In some embodiments, pin 1200 comprises downward sloped surfaces 52. Downward sloped surfaces 52 are configured to push against corresponding tabs on cap 1100 based at least upon the pin being pushed up with respect to the cap during insertion of the pin-cap assembly into a slot in the chassis. Cap walls 50 are configured to expand within the slot and attach the pin-cap assembly to the chassis slot based at least in part on pin tabs being pushed outward.

Figure 8:
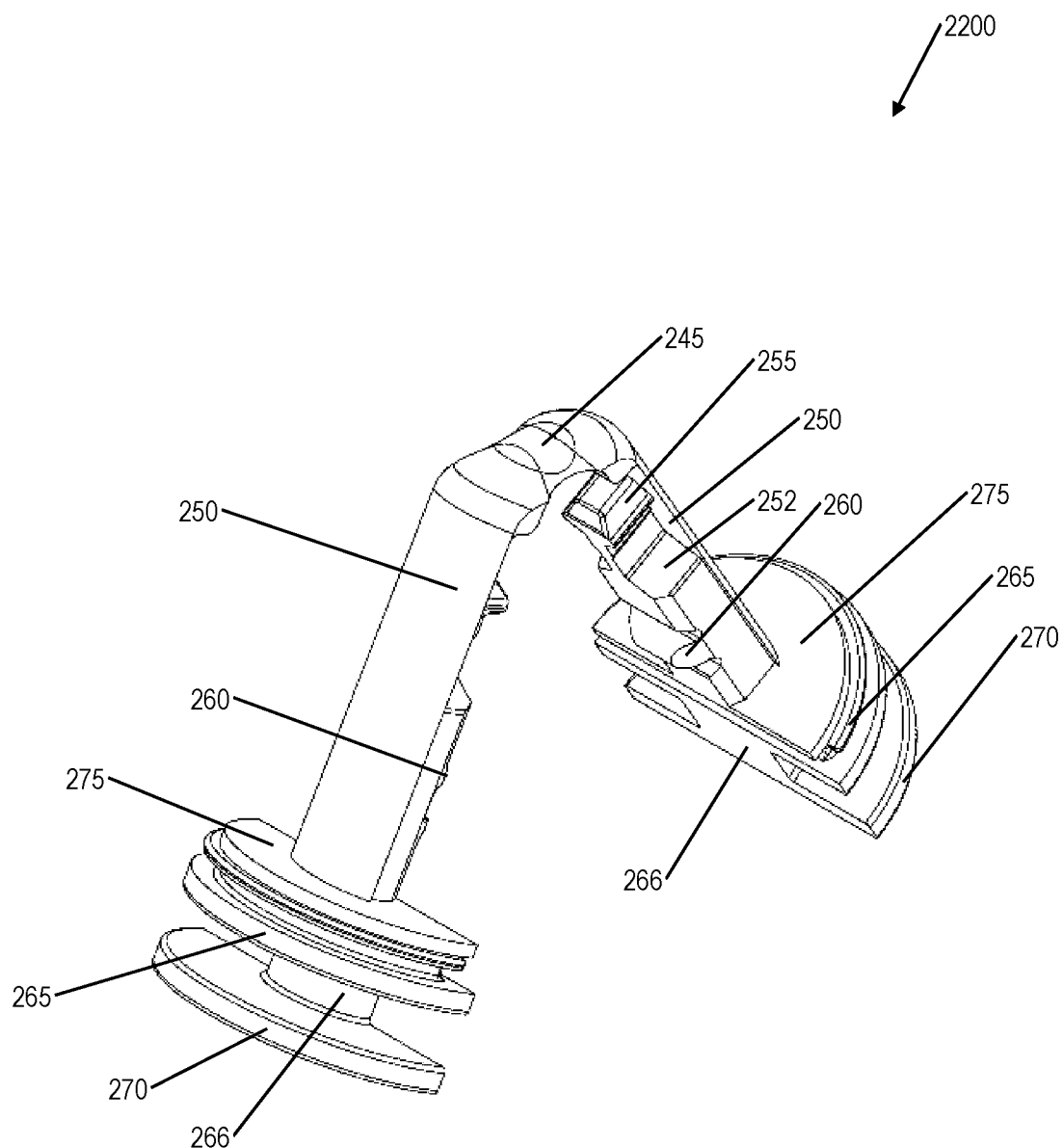
FIG. 8 is a view of another pin of a fastener clip assembly, in accordance with some embodiments.

FIG. 8 is a view of another pin of a fastener clip assembly, in accordance with some embodiments.

In some embodiments, pin 2200 is configured to be interlocked with cap 2100, and the two-part assembly is configured to engage and attach to a slot in a chassis and in addition engage and attach to a panel.

In some embodiments, pin 2200 includes a pin top portion 245 extending down into pair of legs 250. In some embodiments, pin top portion is configured to enter a slot in a chassis first and thus protect the cap and other parts of the assembly from being damaged or pushed the wrong way in response the clip being inserted into the slot.

At the bottom end, the legs 250 include a first surface 265 and a second surface 270 coupled via stem 266. In some embodiments, pin 2200 is configured to be attached/snapped to/onto a doghouse on a panel via stem 266 while being supported against the doghouse above and below by first surface 265 and second surface 270.

In some embodiments, pin 2200 may also include optional edge 275 configured to receive an optional seal. In some embodiments, the seal may be configured to form a seal against a chassis. In some embodiments, the seal may prevent debris and moisture from entering a vehicle. In some embodiments, the seal may be overmolded using rubber or other such material onto pin 2200. In some embodiments, the rubber from the seal may extend into a channel passing through pin 2200 for additional stability.

In some embodiments, pin 2200 also includes pin snap locks 260, which include a male portion and a female portion, one on each of pin legs 250. In some embodiments, pin snap locks 260 are configured to couple the two halves of pin 2200 together in response to the two halves being pushed together during assembly.

In some embodiments, the two halves of the pin define a void between them configured to receive a portion of the pin as the pin and the cap are interlocked together. In some embodiments, pin male snap lock 255 is configured to engage corresponding cap female snap lock 230 in response to the pin being pushed up with respect to the cap. In an interlocked position, the pin and the cap are configured to slide up and down relative to each other.

In some embodiments, pin 2200 comprises downward sloped surfaces 252. Downward sloped surfaces 252 are configured to push against corresponding tabs on cap 2100 based at least upon the pin being pushed up with respect to the cap during insertion of the pin-cap assembly into a slot in the chassis. Cap walls 250 are configured to expand within the slot and attach the pin-cap assembly to the chassis slot based at least in part on pin tabs being pushed outward.

Figure 9:
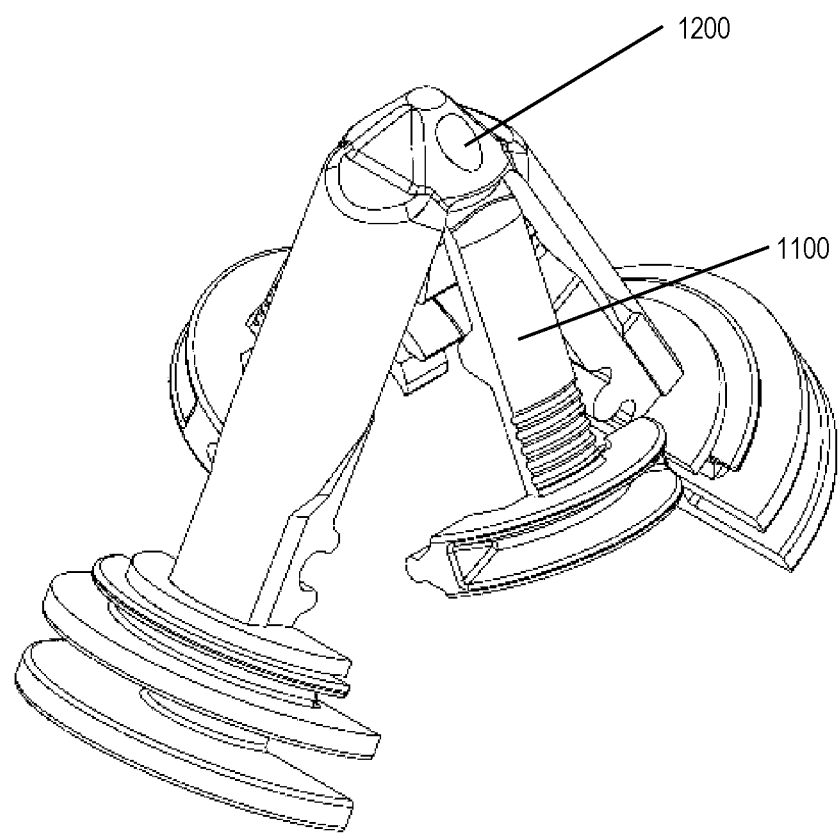
FIG. 9 is a view of a pin and a cap interlocked with each other, in accordance with some embodiments.

FIG. 9 is a view of a pin and a cap interlocked with each other, in accordance with some embodiments.

Figure 10:
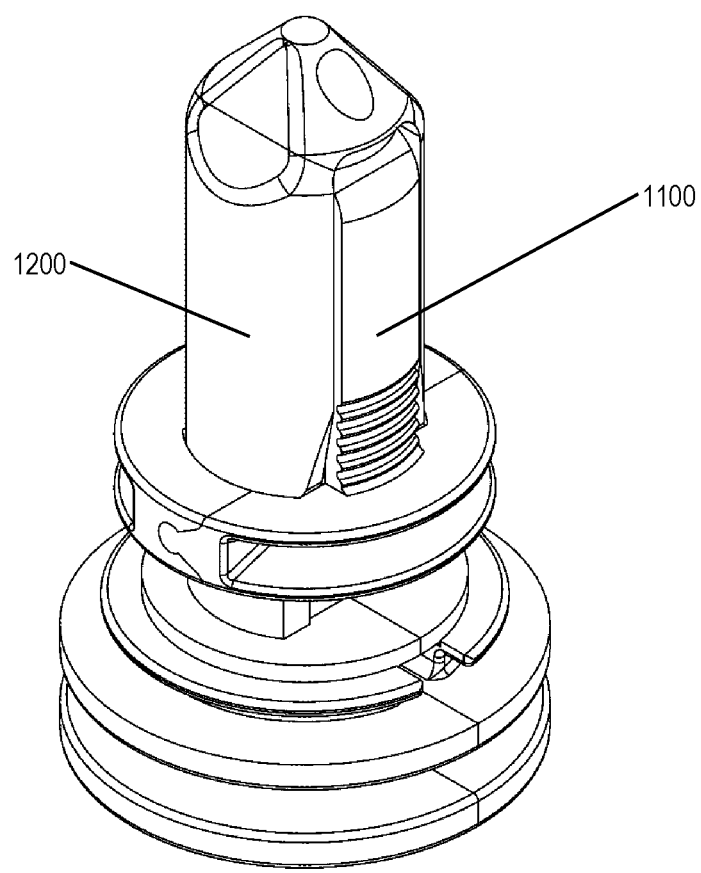
FIG. 10 is an assembled view of a pin and cap interlocked with each other, in accordance with some embodiments.

FIG. 10 is an assembled view of a pin and cap interlocked with each other, in accordance with some embodiments.

In some embodiments, cap 1100 and pin 1200 are configured to be interlocked to each other. In some embodiments, cap 1100 is first placed within pin 1200. Pin 1200 is then snapped closed over cap 1100. Pin snap lock 60 (the male and female portions) is configured to hold the pin in the closed position.

Cap 1100 is then snapped closed over the already closed pin 1200, thereby interlocking the cap and pin together. In some embodiments, cap snap locks 40 (the male and female portions) are configured to snap closed together to hold the cap in a closed position over around the pin.

In some embodiments, while the cap and pin are interlocked together, the pin and the cap are configured to slide up and down relative to and within each other. The two-part assembly may be removably attached to a slot in the chassis based at least upon the cap and the pin being configured to slide up and down relative to each other.

Figure 11:
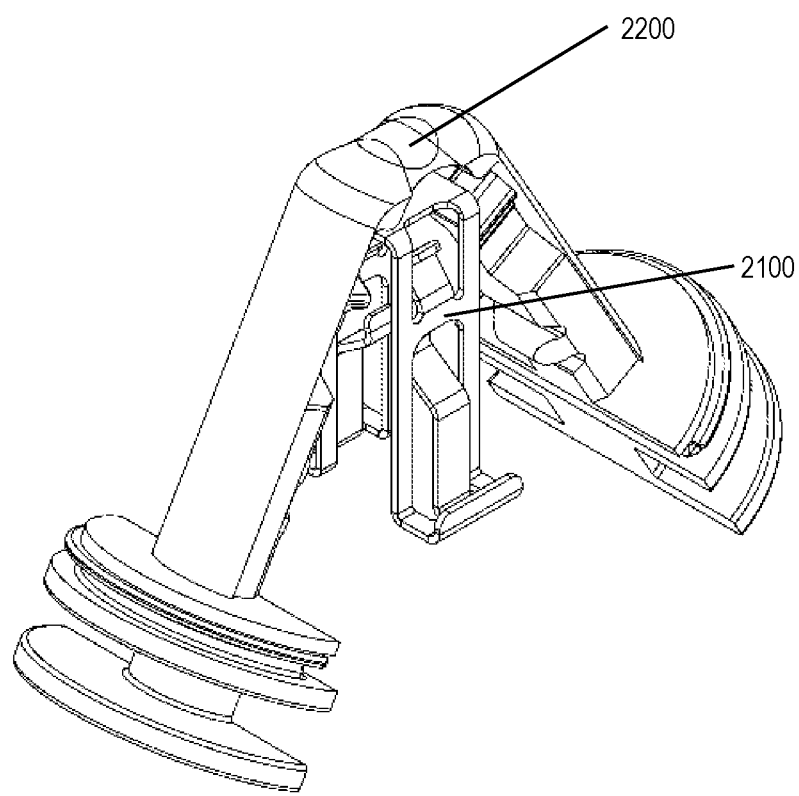
FIG. 11 is a view of another pin and another cap interlocked with each other, in accordance with some embodiments.

FIG. 11 is a view of another pin and another cap interlocked with each other, in accordance with some embodiments.

Figure 12:
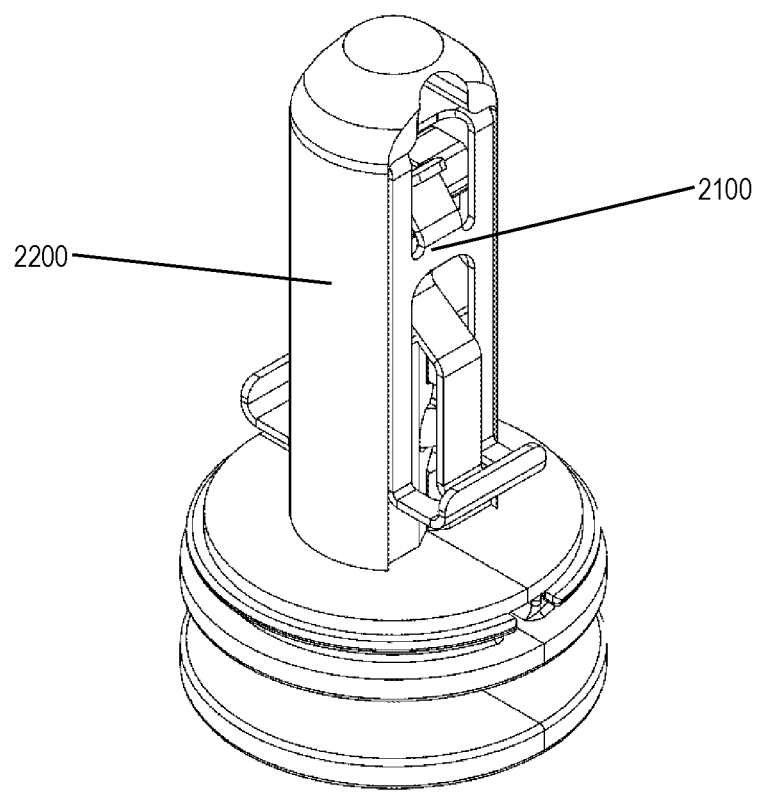
FIG. 12 is an assembled view of another pin and another cap interlocked with each other, in accordance with some embodiments.

FIG. 12 is an assembled view of another pin and another cap interlocked with each other, in accordance with some embodiments.

In some embodiments, cap 2100 and pin 2200 are configured to be interlocked to each other. In some embodiments, cap 2100 is placed within pin 2200. Pin 2200 is then snapped closed over cap 2100. Pin snap lock 260 (the male and female portions) is configured to hold the pin in the closed position.

In some embodiments, while the cap and pin are interlocked together, the pin and the cap are configured to slide up and down relative to and within each other. The two-part assembly may be removably attached to a slot in the chassis based at least upon the cap and the pin being configured to slide up and down relative to each other.

Figure 13:
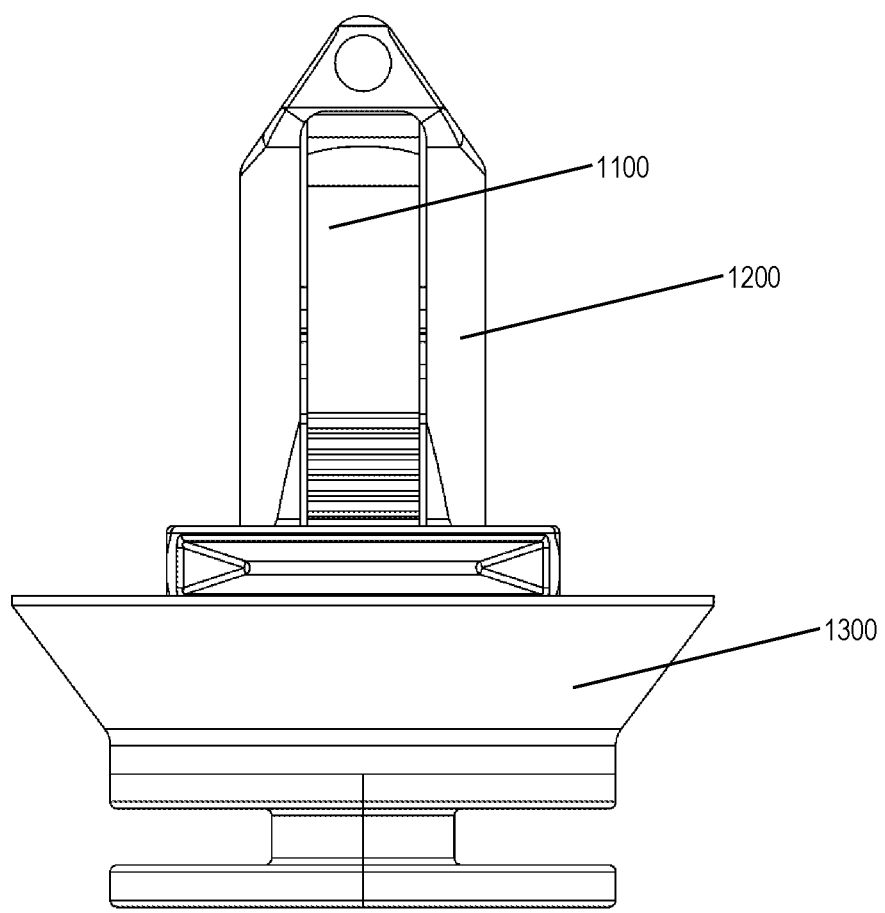
FIG. 13 is an assembled view of a fastener clip assembly, in accordance with some embodiments.

FIG. 13 is an assembled view of a fastener clip assembly, in accordance with some embodiments.

Figure 14:
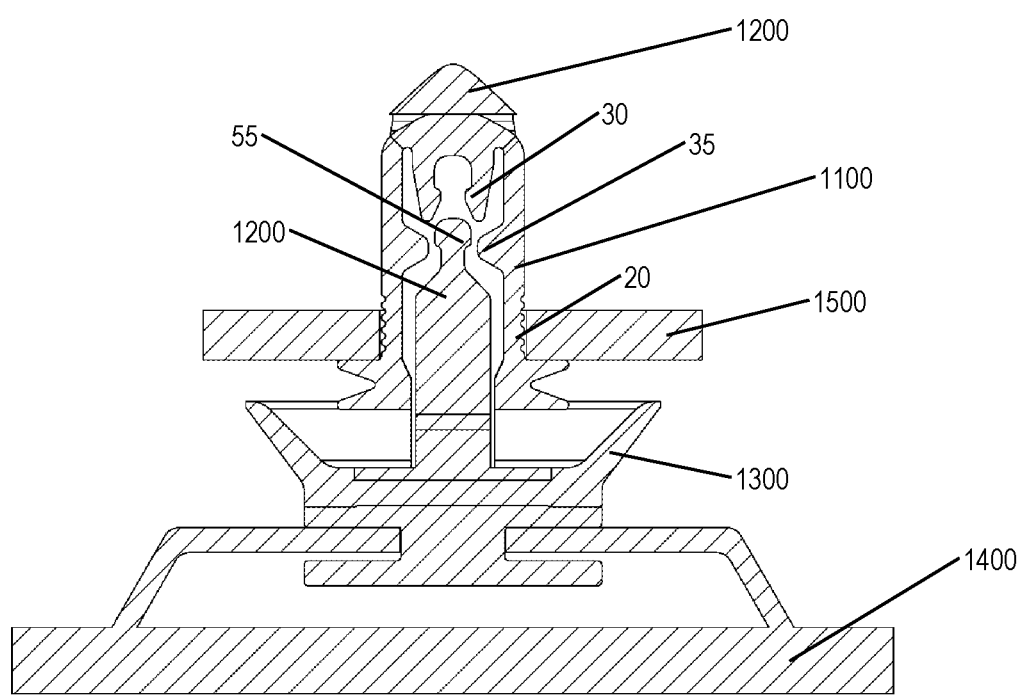
FIG. 14 is an assembled view of a fastener clip assembly prior to engagement on a chassis, in accordance with some embodiments.

FIG. 14 is an assembled view of a fastener clip assembly prior to engagement on a chassis, in accordance with some embodiments.

Figure 15:
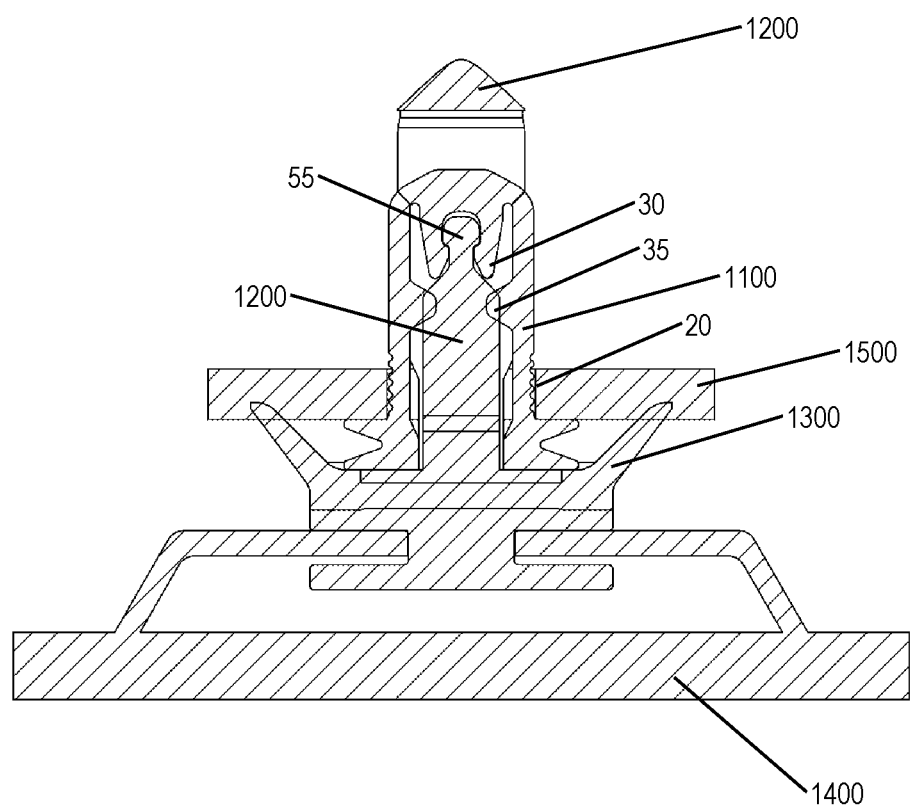
FIG. 15 is yet another assembled view of a fastener clip assembly in an engaged position, in accordance with some embodiments.

FIG. 15 is yet another assembled view of a fastener clip assembly in an engaged position, in accordance with some embodiments.

In some embodiments, the pin 1200 and the cap 1100 may be interlocked together as described above, optionally with seal 1300 molded onto pin 1200.

In some embodiments, the bottom of the pin-cap assembly may be coupled to a doghouse on panel 1400. The panel may be then attached to chassis 1500 based at least upon pushing the top of the panel-attached pin-cap assembly through a slot in chassis 1500.

As is shown in FIG. 14, in some embodiments, upon initial insertion into the chassis, pin 1200 is in a lower position with respect to cap 1100. As such, pin male snap lock 55 has not yet engaged cap female snap lock 30, and tabs 35 are not being pushed outward by the pin.

As is shown in FIG. 15, in some embodiments, as the panel is being pushed toward the chassis, the feet of cap 1100 reach the chassis causing the cap to stop. In that position, ribbed portions 20 of the cap reach the slot in chassis 1500.

In some embodiments, as the panel is continued to be pushed toward the chassis (as is shown in FIG. 15), pin 1200, which is attached to the panel, begins to move up relative to the cap 1100. Eventually, pin male snap lock 55 reaches cap female snap lock 30 and attaches the pin to the cap in this upper position for the pin.

In some embodiments, in response to the pin moving up relative to the cap, the sides of the pin are configured to push against tabs 35 of the cap. In response to tabs 35 being pushed outward, the walls of cap 1100 are pushed to expand outward above the slot in the chassis, expanding the effective diameter of the cap over the slot in the chassis. As a result of the expansion of the walls of cap in that location, the cap is now secured to the slot in the chassis. Ribbed portions 20 of the cap frictionally further increase the secure attachment of the cap to the chassis. The pin is also now secured to the chassis as the pin is secured to the cap via pin male snap lock 55 and cap female snap lock 30.

It should be noted that the attachment of the cap to the slot in the chassis via the expansion of the cap walls can accommodate a range of chassis thicknesses and not limited to a specific chassis width as the expansion of the walls of the cap can accommodate the various thicknesses of the chassis.

In some embodiments, seal 1300 is configured to form a seal against chassis 1500 based at least upon the pin pushed up toward the chassis.

In some embodiments, the fastener clip may be manufactured with injection molding using materials such as plastic nylon, polyoxymethylene (POM, also known as acetal), ABS, Polypropylene, rubber materials of various hardness, etc. It should be noted again that different materials may be used for the different parts of the fastener clip.

Figure 16:
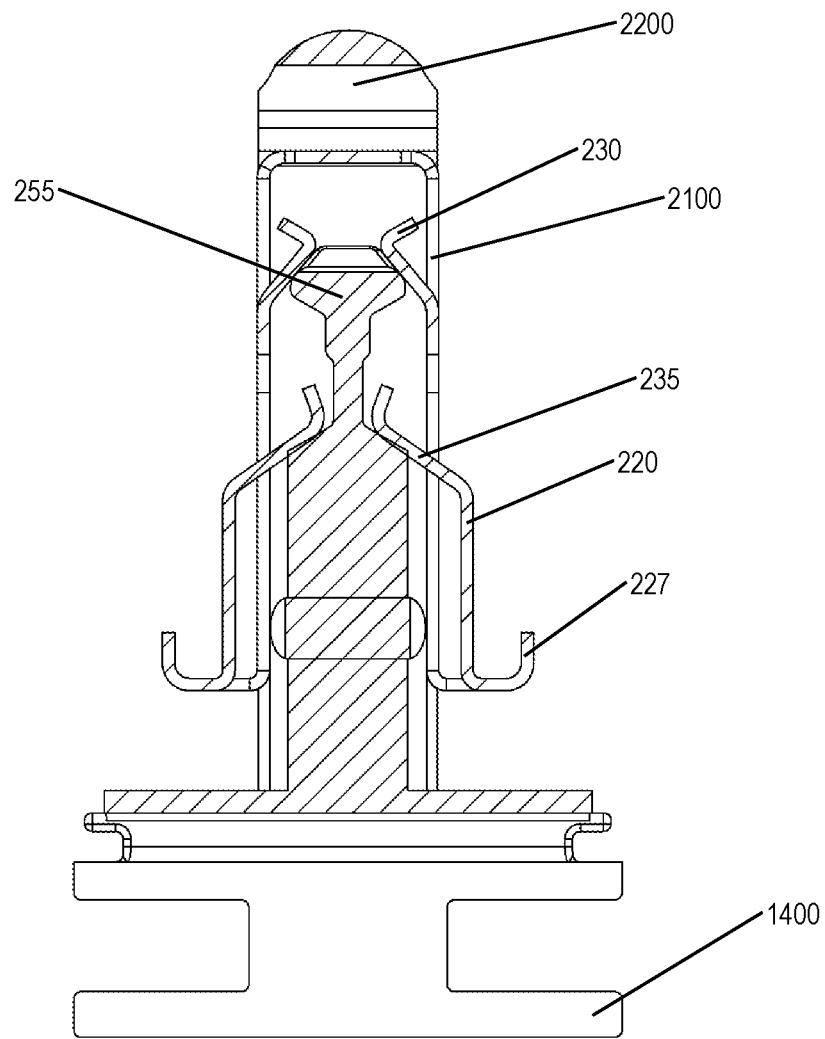
FIG. 16 is an assembled view of another fastener clip assembly prior to engagement on a chassis, in accordance with some embodiments.

FIG. 16 is an assembled view of another fastener clip assembly prior to engagement on a chassis, in accordance with some embodiments.

Figure 17:
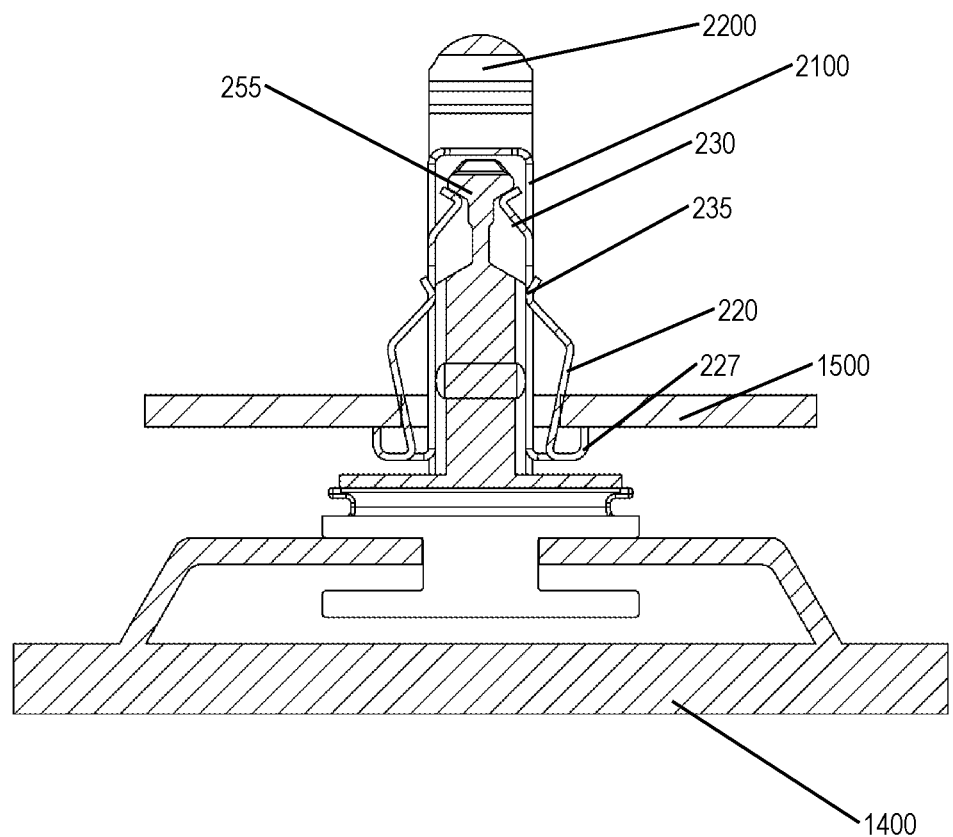
FIG. 17 is an assembled view of another fastener clip assembly in an engaged position, in accordance with some embodiments.

FIG. 17 is an assembled view of another fastener clip assembly in an engaged position, in accordance with some embodiments.

Figure 18:
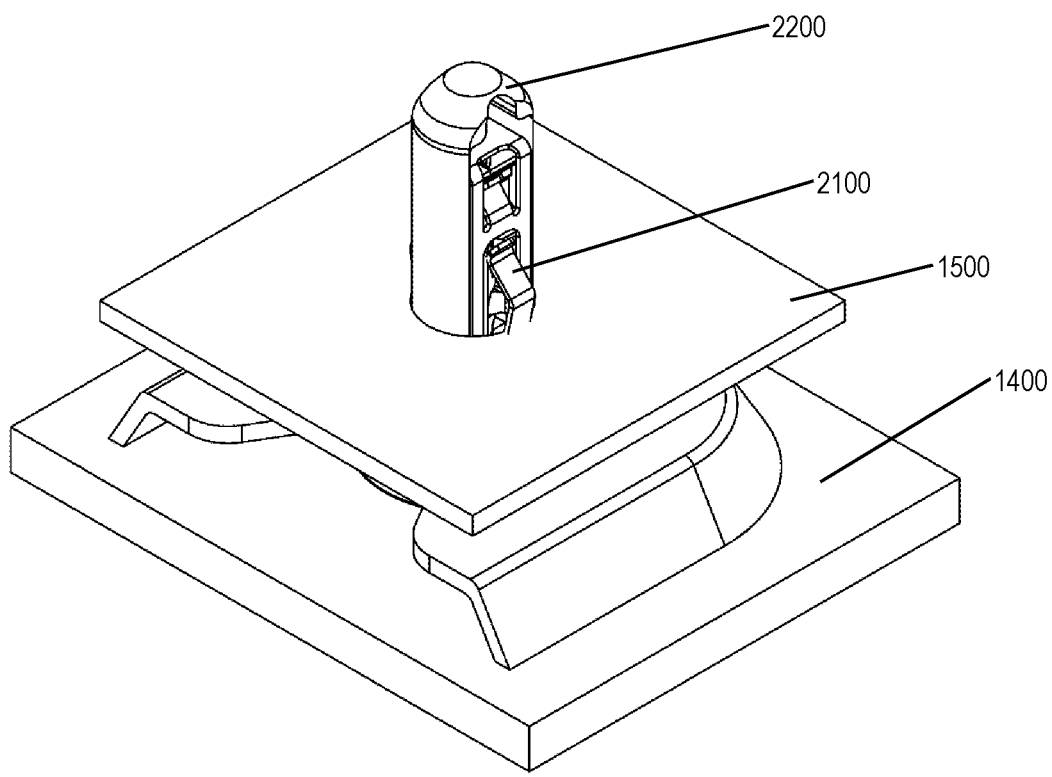
FIG. 18 is an alternative assembled view of another fastener clip attached to a chassis, in accordance with some embodiments.

FIG. 18 is an alternative assembled view of another fastener clip attached to a chassis, in accordance with some embodiments.

In some embodiments, the pin 2200 and the cap 2100 may be interlocked together as described above. Optionally, a seal may be overmolded onto pin 2200.

In some embodiments, the bottom of the pin-cap assembly may be coupled to a doghouse on panel 1400. The panel may be then attached to chassis 1500 based at least upon pushing the top of the panel-attached pin-cap assembly through a slot in chassis 1500.

As is shown in FIG. 16 in some embodiments, upon initial insertion into the chassis, pin 2200 is in a lower position with respect to cap 2100. As such, pin male snap lock 255 has not yet engaged cap female snap lock 230, and tabs 235 have not yet been pushed outward by the pin 2200.

As is shown in FIG. 17, in some embodiments, as the panel is being pushed toward the chassis, the feet of cap 2100 (more specifically, raised feet portions 227) reach the chassis causing the cap to stop. In that position, wings 220 of the cap reach the slot in chassis 1500.

In some embodiments, as the panel is pushed up toward the chassis (as is shown in FIG. 17), pin 2200, which is attached to the panel, begins to move up relative to the cap 2100. Eventually, pin male snap lock 255 reaches cap female snap lock 230 and attaches the pin to the cap in this upper position for the pin.

In some embodiments, in response to the pin moving up relative to the cap, the slanted sides of the pin adjacent to wings 220 of cap 2100 are configured to push against tabs 235 of the cap. In response to tabs 235 being pushed outward, wings 220 are pushed to outward above and around the slot in the chassis, expanding the effective diameter of the cap over the slot in the chassis. As a result of the expansion of wings 220, the cap is now secured to the slot in the chassis. Wings 220 of the cap frictionally further increase the secure attachment of the cap to the chassis. The pin is also now secured to the chassis as the pin is secured to the cap via pin male snap lock 255 and cap female snap lock 230.

It should be noted that the attachment of the cap to the slot in the chassis via the expansion of the wings can accommodate a range of chassis thicknesses and is not limited to a specific chassis width.

In some embodiments, an optional seal may be fitted to pin 2200. In some embodiments, the optional seal may be configured to form a seal against chassis 1500 based at least upon the pin pushed up toward the chassis.

In some embodiments, the fastener clip may be manufactured with injection molding using materials such as plastic nylon, polyoxymethylene (POM, also known as acetal), ABS, Polypropylene, rubber materials of various hardness, etc. It should be noted again that different materials may be used for the different parts of the fastener clip.

In some embodiments, cap 2100 may be made out of metal.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A fastener clip assembly comprising:
a cap, the cap comprising:
   a cap top portion;
   one or more cap legs extending from the top portion;
   one or more feet at the bottom of the legs;
   one or more tabs extending on the inside of the one or more legs;
a pin, the pin being configured to slide around and within the cap, based at least upon the pin being configured to be snapped closed around the cap to form a cap-pin assembly,
   wherein the cap-pin assembly is configured to couple a panel to a slot in a chassis based at least upon the cap-pin assembly being configured to attach to the slot in the chassis and to the panel,
   wherein the cap is configured to expand around the chassis slot based at least upon the pin being configured to push the one or more tabs outwardly in response to the pin being pushed up passed the tabs,
   wherein the pin comprises one or more downward sloped surfaces configured to push the one or more tabs outwardly based at least upon the pin being pushed up relative to the cap.

2. The fastener clip assembly of claim 1, wherein the cap comprises one or more wings attached to the one or more cap legs, wherein the wings are configured to be expanded outwardly around the chassis slot in response to the pin being configured to push the tabs outwardly in response to the pin being pushed up passed the tabs.

3. The fastener clip assembly of claim 1, wherein the pin is configured to be pushed up with respect to the cap based at least upon the feet of the cap reaching the chassis and resting against the chassis.

4. The fastener clip assembly of claim 1, wherein the cap comprises a cap lock and wherein the pin comprises a pin lock, wherein the pin is configured to be secured to the cap based at least upon the pin being pushed up and the pin lock engaging the cap lock.

5. The fastener clip assembly of claim 1, further comprising a seal attached to the pin, wherein the seal is configured to form a seal against the chassis based at least upon the pin being pushed up into the chassis.

6. The fastener clip assembly of claim 1, wherein the cap is made out of metal.

7. The fastener clip assembly of claim 1, wherein the cap is molded out of plastic and is configured to be assembled together by at least one cap snap lock.

8. The fastener clip assembly of claim 1, wherein the cap comprises ribbed portions on the cap legs at a location where the cap engages the slot in the chassis.

9. A fastener clip assembly comprising:
a chassis comprising a chassis slot configured to receive a cap from a pin-cap assembly;
a panel comprising a receiving opening configured to receive a pin;
the cap comprising:
   a cap top portion;
   one or more cap legs extending from the top portion;
   one or more feet at the bottom of the legs;
   one or more tabs extending on the inside of the one or more legs;

the pin being configured to slide around and within the cap, based at least upon the pin being configured to be snapped closed around the cap to form a cap-pin assembly, wherein the cap-pin assembly is configured to couple the panel to the slot in the chassis based at least upon the cap-pin assembly being configured to attach to the slot in the chassis and to the panel, wherein the cap is configured to expand around the chassis slot based at least upon the pin being configured to push the one or more tabs outwardly in response to the pin being pushed up passed the tabs.

10. The fastener clip assembly of claim 9, wherein the cap comprises one or more wings attached to the one or more cap legs, wherein the wings are configured to be expanded outwardly around the chassis slot in response to the pin being configured to push the tabs outwardly in response to the pin being pushed up passed the tabs.

11. The fastener clip assembly of claim 9, wherein the pin comprises one or more downward sloped surfaces configured to push the one or more tabs outwardly based upon the pin being pushed up relative to the cap.

12. The fastener clip assembly of claim 9, wherein the pin is configured to be pushed up with respect to the cap based at least upon the feet of the cap reaching and resting against the chassis.

13. The fastener clip assembly of claim 9, wherein the cap comprises a cap lock and wherein the pin comprises a pin lock, wherein the pin is configured to be secured to the cap based at least upon the pin being pushed up and the pin lock engaging the cap lock.

14. The fastener clip assembly of claim 9, further comprising a seal attached to the pin, wherein the seal is configured to form a seal against the chassis based at least upon the pin being pushed up into the chassis.

15. The fastener clip assembly of claim 9, wherein the cap is made out of metal.

16. The fastener clip assembly of claim 9, wherein the cap is molded out of plastic and is configured to be snapped together by at least one cap snap lock.

17. The fastener clip assembly of claim 9, wherein the cap comprises ribbed portions on the cap legs at a location where the cap engages the slot in the chassis.

\* \* \* \* \*